UNITED STATES PATENT OFFICE.

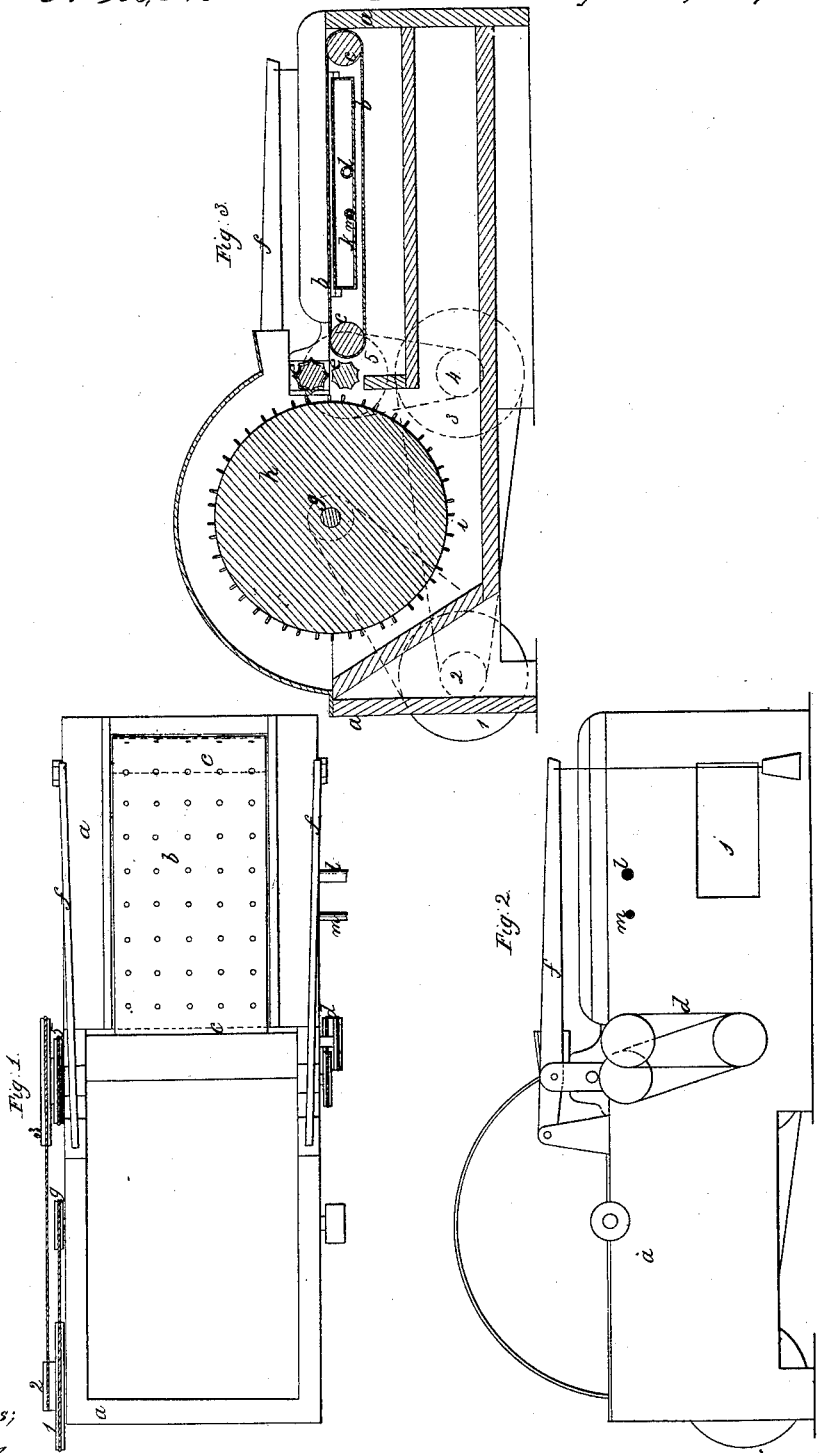

J. F. GREENE, OF BROOKLYN, NEW YORK, ASSIGNOR TO SAML. B. TOBEY, OF PROVIDENCE, RHODE ISLAND.

MACHINERY FOR DISINTEGRATING WASTE FELT FABRICS.

Specification of Letters Patent No. 23,643, dated April 12, 1859.

*To all whom it may concern:*

Be it known that I, JOHN F. GREENE, of Brooklyn, in the State of New York, have invented a certain new and useful machine for disintegrating or tearing up waste and refuse felted fabrics to obtain the fibers therefrom in a suitable condition for use in the production of other fabrics; and I do hereby declare that the following is a full, clear, and exact description thereof, reference being had to the accompanying drawings, which make part of this specification, in which—

Figure 1 is a plan of the machine; Fig. 2 a side elevation; and Fig. 3 a longitudinal vertical section.

The same letters indicate like parts in all the figures.

The object of my invention is to disintegrate or tear apart waste and refuse felts according to a process described in an application for Letters Patent filed by me of even date with this, and my invention consists in combining a steaming apparatus with a picker so that the felts may be thoroughly steamed before and as they are being presented to the picking operation.

In the accompanying drawings $a$ represents a suitable frame, and $b$ a feed apron passing around two rollers $c$, $c$, one of which receives motion by a band $d$ in the manner represented. This feed apron is for the purpose of regularly presenting the stock to a pair of fluted feed rollers $e$, $e$, the lower one running in fixed boxes, and the other in movable boxes borne down by weighted levers $f$ $f$ that the stock may be gripped and firmly held while undergoing the picking operation. I prefer to cover the upper feed roller with cloth as I have observed that it holds the stock more advantageously than when not so covered.

The lower one of these feed rollers receives motion from a pulley $g$ on the shaft of the picking cylinder, by a system of bands and wheels represented by dotted lines in Fig. 3, and numbered from 1 to 5 inclusive.

As the stock is presented by the feed apron it is acted upon by teeth or pins projecting from the surface of a rapidly rotating cylinder $h$ which should make about nine hundred revolutions per minute, and as the stock is firmly gripped by the feed rollers the teeth act upon and in a short time open the felt and separate the fibers of which it is composed, throwing them into the box $i$ below, along which they are driven by the current of air, and taken out through an opening $j$ at the side, to be again put on the feed apron, when not sufficiently opened, to be again subjected to the action,—steamed and picked.

The feed apron $b$ should be made of some pervious material such as wire gauze or open fabric, or of leather pierced with numerous small holes, so that steam may pass through freely. Below the upper part of the apron there is a box $k$ with a perforated top, and occupying nearly the whole space between the rollers $c$, $c$, the apron $b$ passing over the pervious top of the box. This box is to be supplied with steam from any suitable steam boiler by a pipe $l$, another pipe $m$ being provided for the return of any water of condensation.

The fur to be picked is spread evenly upon the apron, and as it is carried along slowly by the motion of the apron the steam issuing from the box and passing through the meshes of the apron thoroughly saturates the pieces of fur which are then taken in that condition by the feed rollers and presented to the picker cylinder the teeth of which readily open and tear apart and draw out the fibers.

If the felt to be disintegrated has been coated or saturated with shellac or other gum, resin, or glue, before being subjected to the operation of this machine it will be found necessary to dissolve and wash out such cementing matter by any suitable process, such as boiling for about half an hour in a solution of fifty pounds of sal soda to three hundred pounds of stock to be treated, and dissolve that in 320 gallons of water, and after boiling, letting it steep in such solution for about three hours, then drawing off the liquor, washing in clean water and drying.

I do not wish to be understood as limiting myself to the special mode of applying the steam to the felts as this may be done in various ways, as for instance the steam box may be put above the feed apron and the steam discharged downward onto the felt, or jets of steam may be discharged from suitable pipes at the sides; but the mode first above named will be found to be the best. Nor do I wish to be understood as limiting myself to any special construction of picker, as any suitable picker may be substituted for the one above described, which however I have found to be the best.

What I claim as my invention and desire to secure by Letters Patent is—

The combination of the steaming apparatus and the picker, substantially as described, for steaming the felt as it is passed to the picker to be disintegrated, as set forth.

JOHN F. GREENE.

Witnesses:
 WM. V. BROWN,
 WM. H. BISHOP.